(12) United States Patent
Graber

(10) Patent No.: US 6,257,638 B1
(45) Date of Patent: Jul. 10, 2001

(54) TRAVEL TRAILER WITH REAR WALL SLIDE-OUT ROOM

(75) Inventor: Randall L. Graber, Shipshewana, IN (US)

(73) Assignee: K-Z, Inc., Shipshewana, IN (US)

( * ) Notice: Subject to any disclaimer, the term of this patent is extended or adjusted under 35 U.S.C. 154(b) by 0 days.

(21) Appl. No.: 09/397,394

(22) Filed: Sep. 16, 1999

Related U.S. Application Data

(60) Provisional application No. 60/100,512, filed on Sep. 16, 1998.

(51) Int. Cl.[7] ........................................................ B62C 1/06
(52) U.S. Cl. ................................... 296/26.09; 296/26.08; 296/26.13; 296/26.01; 52/67
(58) Field of Search ............................ 296/26.08, 26.09, 296/26.12, 26.13, 26.03, 26.01; 52/67

(56) References Cited

U.S. PATENT DOCUMENTS

| | | |
|---|---|---|
| 3,596,416 | 8/1971 | Hojka . |
| 3,888,539 * | 6/1975 | Niessner ............................. 296/26.09 |
| 3,966,075 * | 6/1976 | Schultz ............................... 296/26.08 |
| 4,065,166 * | 12/1977 | Shoemaker ......................... 296/26.01 |
| 4,106,732 * | 8/1978 | Whiting .................................... 52/67 |
| 4,133,571 * | 1/1979 | Fillios ............................... 296/26.09 |

(List continued on next page.)

FOREIGN PATENT DOCUMENTS

| | | |
|---|---|---|
| 3201413 * | 9/1983 | (DE) . |
| 3710307 * | 10/1988 | (DE) . |
| 20209999 * | 6/1989 | (GB) . |
| 2 244 959 * | 12/1991 | (GB) . |

Primary Examiner—D. Glenn Dayoan
Assistant Examiner—Kiran B. Patel
(74) Attorney, Agent, or Firm—Baker & Daniels

(57) ABSTRACT

A travel trailer having a rear end wall with an extendable or slide-out room. The vehicle also has a floor and an opening in said rear end wall, such that said slide-out room is fitted in said opening. The vehicle includes an upper mechanism and a lower mechanism for supporting the slide-out room for movement between a retracted position within said vehicle spaced above said floor and an extended position projecting rearwardly of said rear end wall. A ceiling is attached to and perpendicular to the rear end wall wherein the upper mechanism includes a guide rail mounted to the ceiling and a hanger attached to the slide-out room for moving within the guide rail. The guide rail has a generally C-shaped cross sectional configuration so as to provide a slot which extends longitudinally along the rail such that the hanger extends through the slot, the hanger having rollers supported within the guide rail to facilitate movement therein. The vehicle further comprises a side wall attached to the floor and the rear end wall perpendicularly orientated to both said end wall and floor such that the upper mechanism alternately includes a guide rail mounted to the side wall and the hanger attached at an inner most end of the slide-out room for moving within the guide rail. The slide-out room is elevated above the floor such that furniture can be stored beneath said slide-out room while in the retracted position. The lower mechanism includes hollowed rectangular frame members attached beneath the floor of the vehicle and support rails sidably disposed within the frame member. A spring loaded lock pin is attached to the frame member for interlocking with camming lugs that are mounted for and aft upon the support rail for securing the room in the fully extended and in the fully retracted position. A swing latch is mounted to the frame member and a hook is mounted at the aft end of the support rail for further securing the slide-out room in the fully retracted position. The vehicle includes a rear bumper assembly mounted to the lower mechanism for supporting the slide-out room. A curtain is attached to and extends downwardly from the slide-out room when said room is in the extended position such that gear and other articles may be stored beneath said slide-out room and within the curtain.

15 Claims, 8 Drawing Sheets

U.S. PATENT DOCUMENTS

| | | | |
|---|---|---|---|
| 4,886,411 | * 12/1989 | Pieperhoff et al. | 296/26 |
| 5,127,697 | * 7/1992 | St. Marie | 296/26.09 |
| 5,248,180 | 9/1993 | Hussaini . | |
| 5,384,992 | * 1/1995 | Roberton | 52/67 |
| 5,560,667 | * 10/1996 | Edry | 296/26.12 |
| 5,628,541 | * 5/1997 | Gardner | 296/26.09 |
| 5,634,683 | * 6/1997 | Young | 52/67 |
| 5,658,032 | * 8/1997 | Gardner | 296/26.01 |
| 5,971,471 | * 10/1999 | Gardner | 296/26.13 |

* cited by examiner

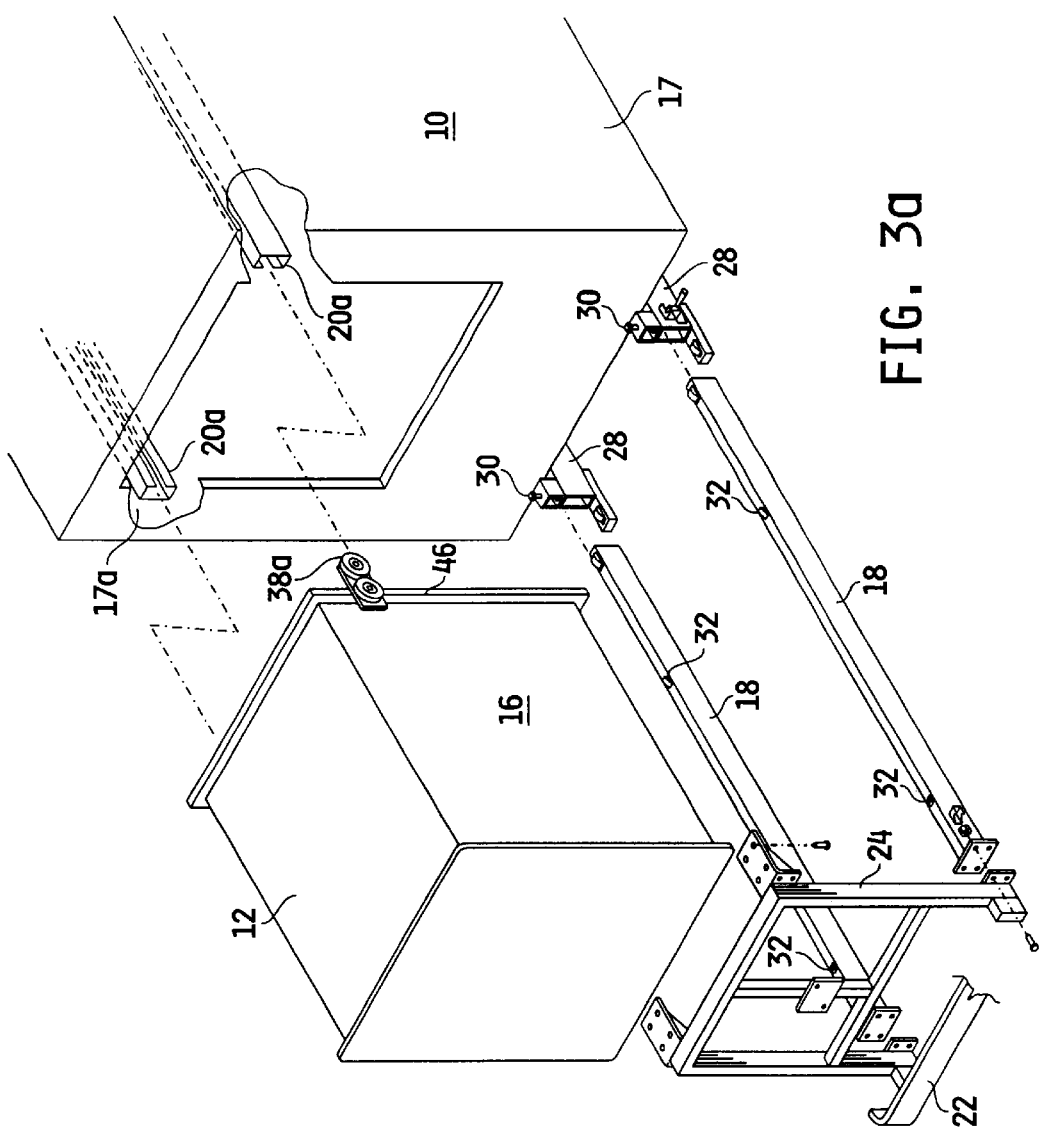

TRAVEL TRAILER WITH REAR WALL SLIDE-OUT ROOM

This application claims domestic priority based upon U.S. Provisional Patent Application No. 60/100,512 filed Sep. 16, 1998.

BACKGROUND OF INVENTION

1. Field of the Invention

This invention relates to recreational vehicles and will have specific but not limited application to a travel trailer having a rear wall which houses an extendable or slide-out room.

2. Related Background Art

Slide-out rooms or comparts in travel trailers, motor homes and the like have become increasingly popular. The slide-out rooms allow for increased usable space when the vehicle is parked and are retractable to accommodate length limitations while in transit.

These moveable room portions usually include a floor, a roof, a side wall and one or more end walls. In the retracted positions, the roof and side walls are typically concealed from exterior view and the room end wall forms a portion of the vehicle's side wall. At the same time, the floor of the moveable portion of the room typically rests above the floor of that portion of the room which remains fixed, and may form a portion of the usable interior floor during vehicle transit. Similarly, the ceiling of a moveable roof portion may define the interior ceiling of that part of the vehicle during transit.

The moveable frames used to support these slide-out rooms need to be kept in alignment relative to the fixed frame of the recreational vehicle in order to ensure that the moveable frame extends and retracts smoothly. Unfortunately, because slide-out rooms are heavy and rather cumbersome, the rooms are liable to twist slightly as they are extended or retracted which causes the room to bind or get stuck, thus damaging the room, the support system or the hydraulic cylinders typically used to move the room. Therefore, in order to prevent these problems, complex alignment and synchronization mechanisms have been developed. These mechanisms add significantly to the cost of a recreational trailer and complexity of construction.

Therefore it is an object of the invention to provide a slide-out room that can be extended and retracted easily without binding or twisting. It is a further object of the invention to provide a slide-out room that can accomplish the above using an efficient, relatively inexpensive and simple design. It is a further object of the invention to provide a frame for a slide-out vehicle that is supported both below the room and at an upper end of the room.

SUMMARY OF THE INVENTION

The objects of the invention have been accomplished by providing a travel trailer having a rear end wall with an extendable or slide-out room. The vehicle also has a floor and an opening in said rear end wall, such that said slide-out room is fitted in said opening. The vehicle includes an upper means and a lower means for supporting the slide-out room for movement between a retracted position within said vehicle spaced above said floor and an extended position projecting rearwardly of said rear end wall.

Another feature of the invention is to have a ceiling attached to and perpendicular to the rear end wall wherein the upper means includes a guide rail mounted to the ceiling and a hanger attached to the slide-out room for moving within the guide rail.

It is a further feature of the invention that the guide rail has a generally C-shaped cross sectional configuration so as to provide a slot which extends longitudinally along the rail such that the hanger extends through the slot, the hanger having rollers supported within the guide rail to facilitate movement therein.

An additional feature of the invention is that the vehicle further comprises a side wall attached to the floor and the rear end wall in perpendicular orientation to both said end wall and floor such that the upper means alternately includes a guide rail mounted to the side wall and the hanger attached at an inner most end of the slide-out room for moving within the guide rail.

Another feature of the invention is that the slide-out room is elevated above the floor such that furniture can be stored beneath said slide-out room while in the retracted position.

It is also a feature of the invention that the lower means includes hollowed rectangular frame members attached beneath the floor of the vehicle and support rails slidably disposed within the frame member. A spring loaded lock pin is attached to the frame member for interlocking with camming lugs that are mounted for and aft upon the support rail for securing the room in the fully extended and in the fully retracted position. A swing latch is mounted to the frame member and a hook is mounted at the aft end of the support rail for further securing the slide-out room in the fully retracted position.

Also, a feature of the invention is that the vehicle includes a rear bumper assembly mounted to the lower means for supporting the slide-out room.

Lastly, it is a feature of the invention that a curtain is attached to and extends downwardly from the slide-out room when said room is in the extended position such that gear and other articles may be stored beneath said slide-out room and within the curtain.

BRIEF DESCRIPTION OF DRAWINGS

FIG. 3A is an exploded view of an alternate embodiment having the upper rails located to the side of the slide-out unit.

DETAILED DESCRIPTION OF THE PREFERRED EMBODIMENT

In this invention the travel trailer is provided with an elevated slide-out room which extends rearwardly from the vehicle to provide an additional living area used principally to accommodate a bed. By the room being elevated, it is able to be supported over furniture such as a couch within the travel trailer when the room is in its retracted or stored position. When in this retracted position, the slide-out room may be used for storage.

Figure 1:
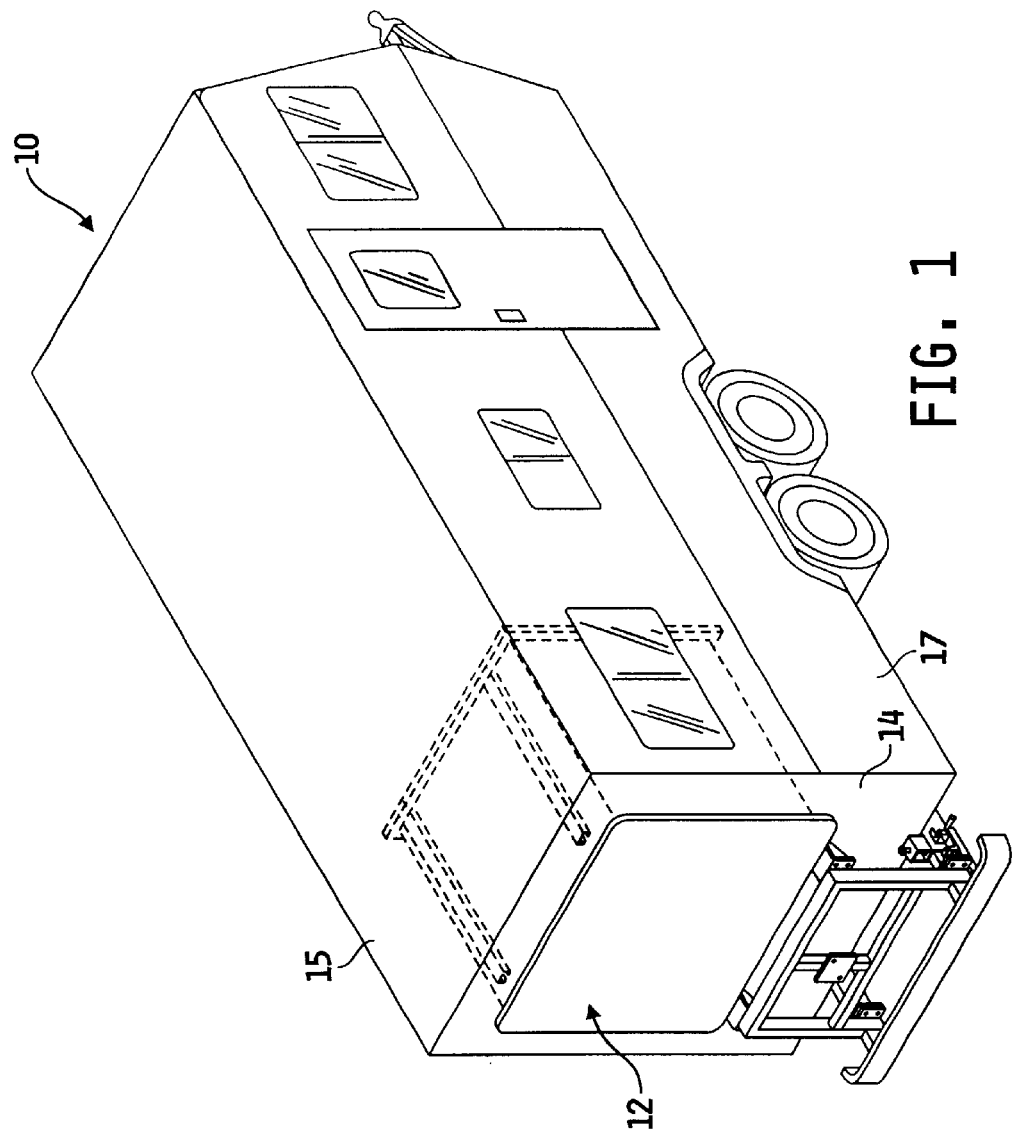
FIG. 1 is a perspective view of a travel trailer having a slide-out room as shown in its stored or retracted position.
Figure 2:
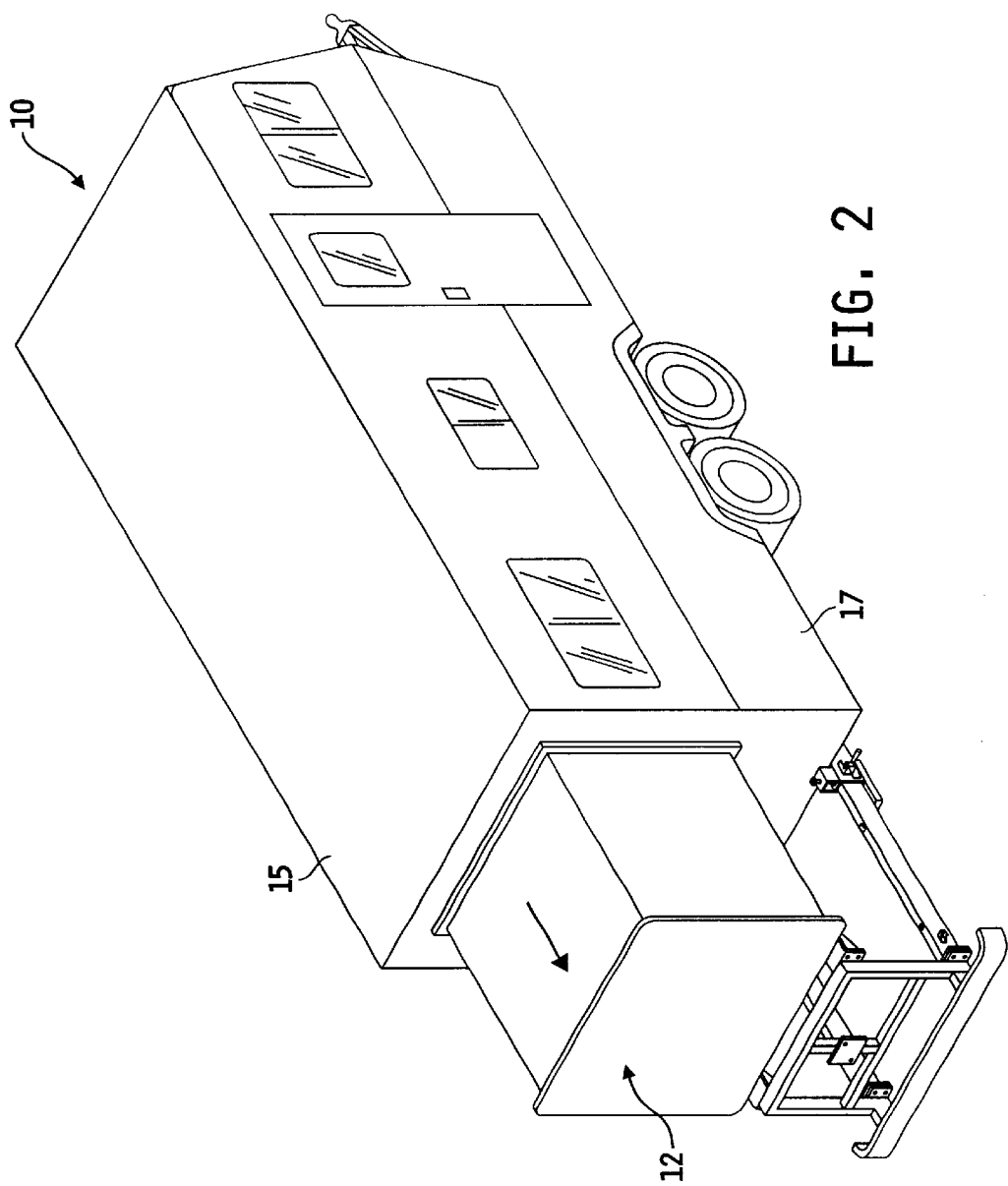
FIG. 2 is a perspective view of a travel trailer shown in FIG. 1 with a slide-out room in an extended position.
Figure 3:
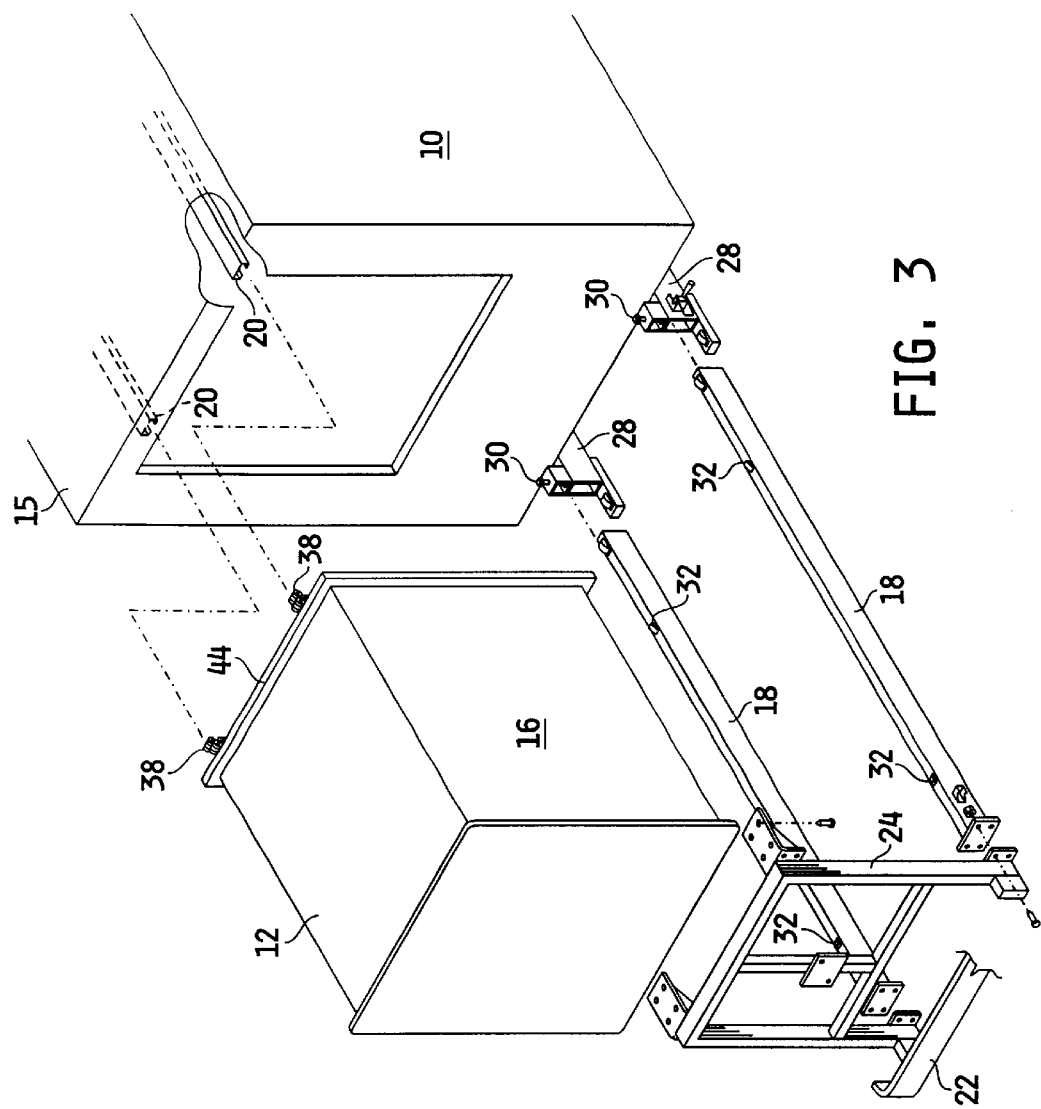
FIG. 3 is an exploded view of the slide-out portion of the trailer.

Turning now to the figures, in FIG. 1 a travel trailer 10 is shown. The slide-out room 12 is shown in its stored or retracted position within the rear wall 14 of the trailer. The trailer includes side walls 17 and a roof or ceiling 15. In FIG. 2 slide-out room 12 is shown in its extended position. In FIG. 3, the component parts of slide-out room 12 are shown in separated form. These component parts are the room housing 16, main support rails 18, and overhead rails 20. The rear bumper assembly 22 of the travel trailer is connected to the support rails 18 and an interconnected support frame 24.

An alternate embodiment of the invention is shown in FIG. 3A. The alternate embodiment includes upper rails 20a which are mounted to side walls 17 as opposed to ceiling 15. Hangers 38a are mounted towards the top of inward side edge portion 46 of room housing 16.

Figure 4:
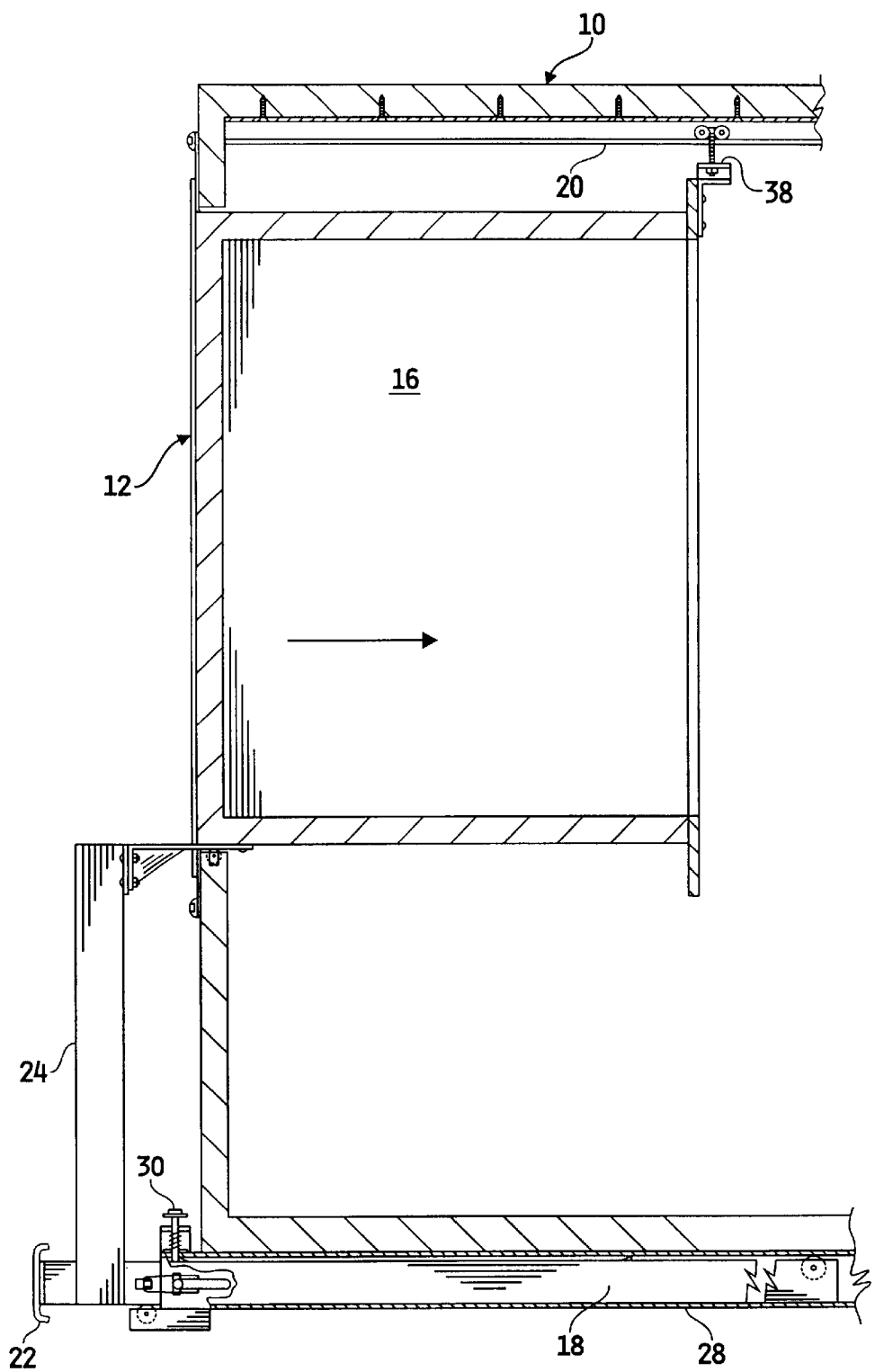
FIG. 4 is a cross-section of the slide-out unit in the retracted position.
Figure 5:
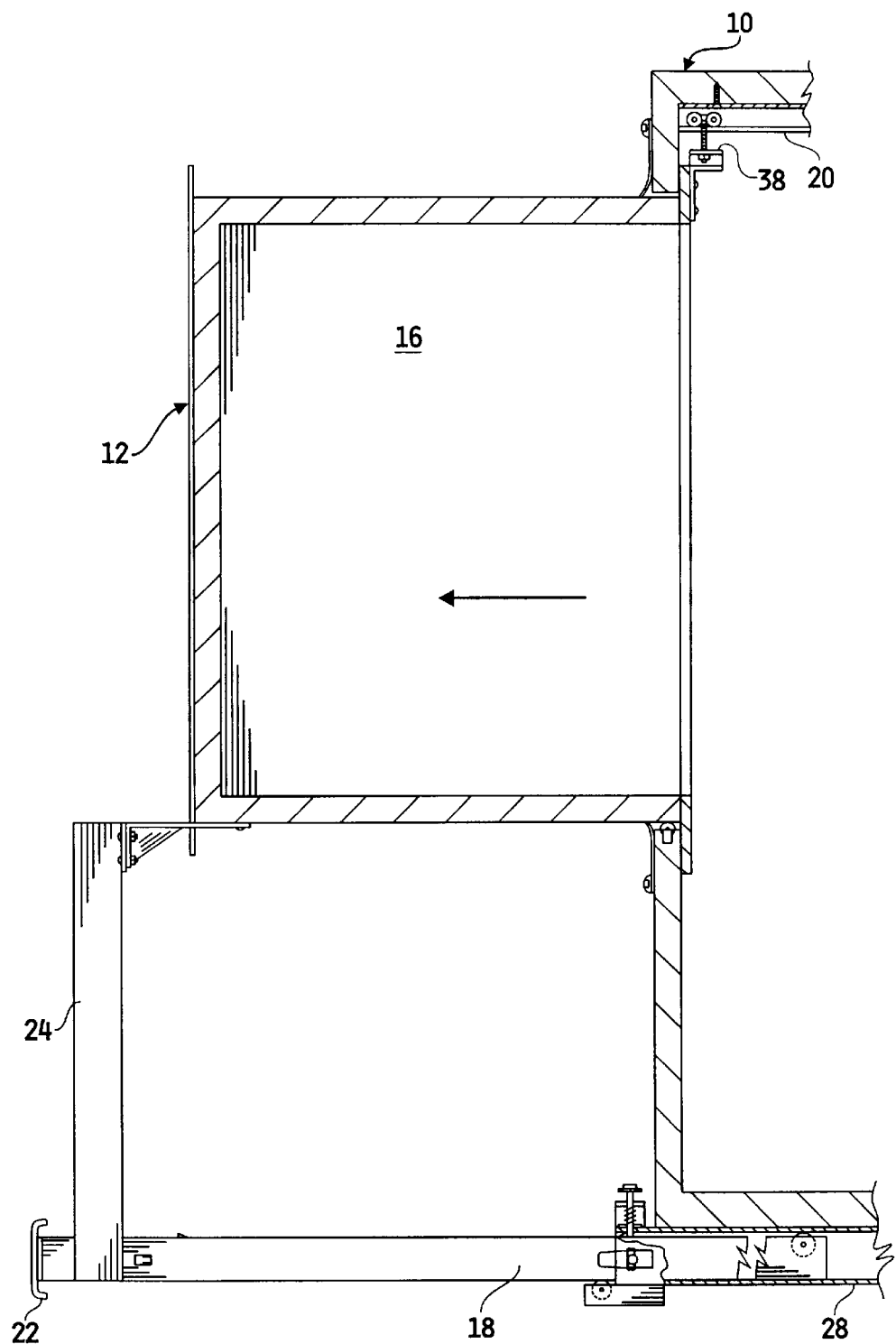
FIG. 5 is a cross-section of the slide-out room in the extended position.
Figure 6:
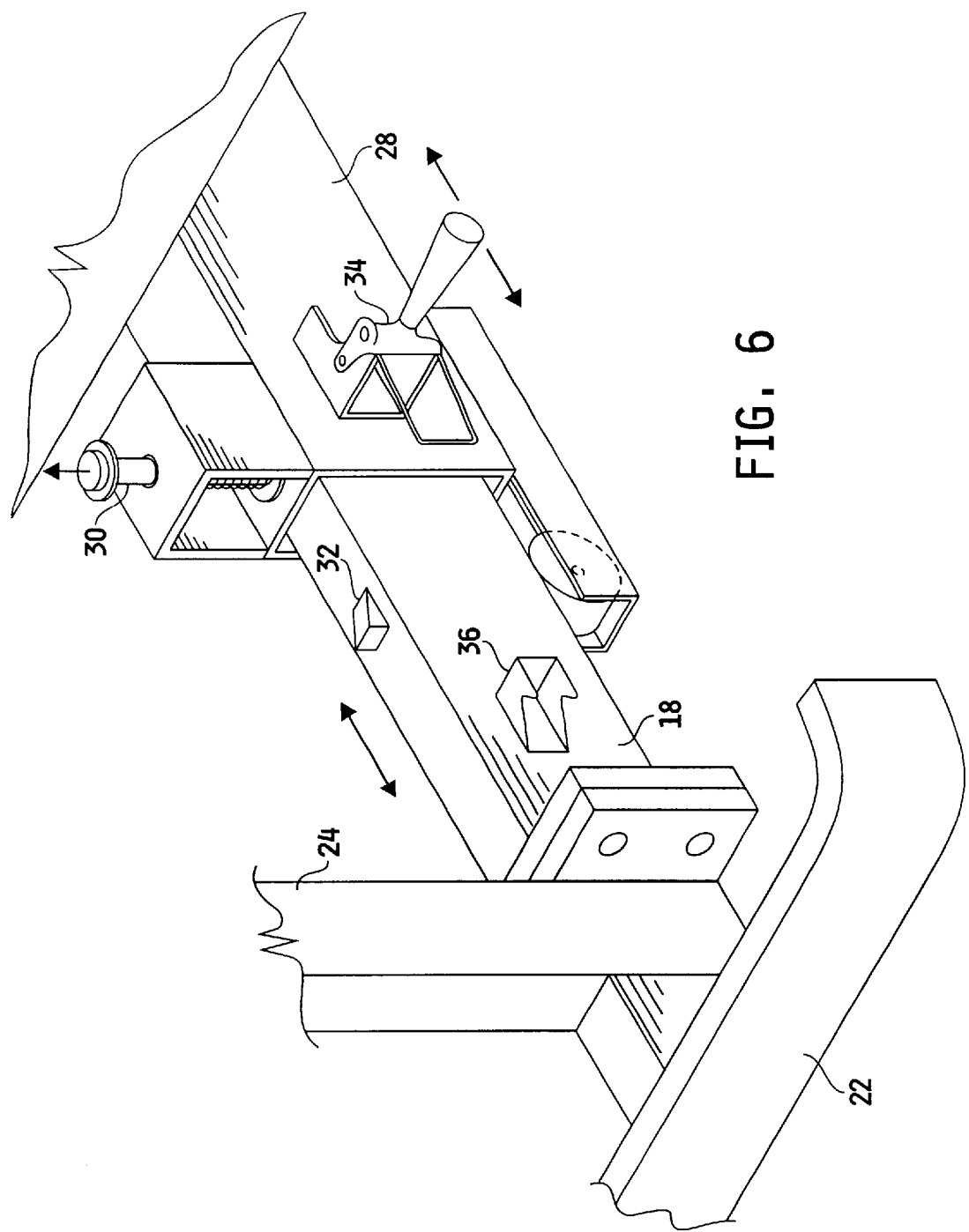
FIG. 6 is an enlarged view of the main support rails of the slide-out unit as disposed within the longitudinally extending frame member and also showing the locking mechanism for securing the slide-out room.

In FIG. 4 the slide-out room 12 is shown in its retracted position in cross section. In FIG. 5 room 12 is shown in its extended position in cross section. In FIG. 6 a detailed view is shown of the manner in which support rails 18 are secured within the frame of vehicle 10. Each support rail 18 is slidably disposed within a longitudinally extending frame member 20 of vehicle 10. As best show in FIG. 6, a spring loaded lock pin 30 is carried upon each of the frame members 28 and serves to secure the slide-out room in its filly extended and fully retracted positions by interlocking with camming lugs 32 carried fore and aft upon each of the rails 18. The slide-out room is more permanently secured in its fully retracted position such as for traveling by a pair of over center swing latches 34 mounted also to each of the frame members 28. Swing latches 34 are adapted to engage hooks 36 mounted at the aft end of each of the support rails 18. Movement of each support rail 18 within its accommodating frame member 28 is facilitates by rollers. As best shown in FIGS. 3, 4 and 5, each of the overhead rails 20, which are mounted to the ceiling 15 of vehicle 10, is of a general C-shape cross sectional configuration so as to provide a slot which extends longitudinally along the rail at its lower surface. A pair of hangers are attached to upper edge 44 at the innermost end of room housing 16 each extending through the slot and with its rollers being supported within the overlying and extending accommodating guide rails 20. In this manner the slide-out room is guided and supported for movement between its extended and retracted positions by rails 20 in conjunction with support rails 18. In particular, hangers 38 serve in conjunction with guide rails 20 to support the slide-out room when it is in its retracted position, elevated from the floor of the vehicle 10.

Figure 8:
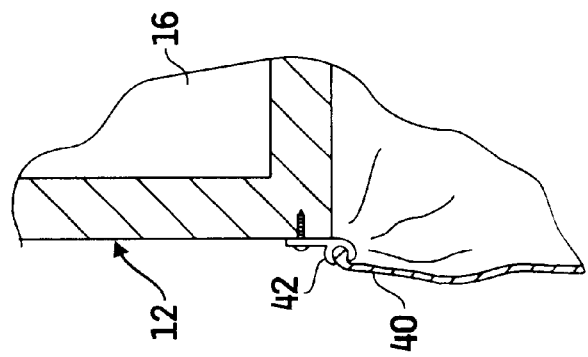
FIG. 8 is a cross section of the securing mechanism for securing the curtain to the slide-out room.
Figure 7:
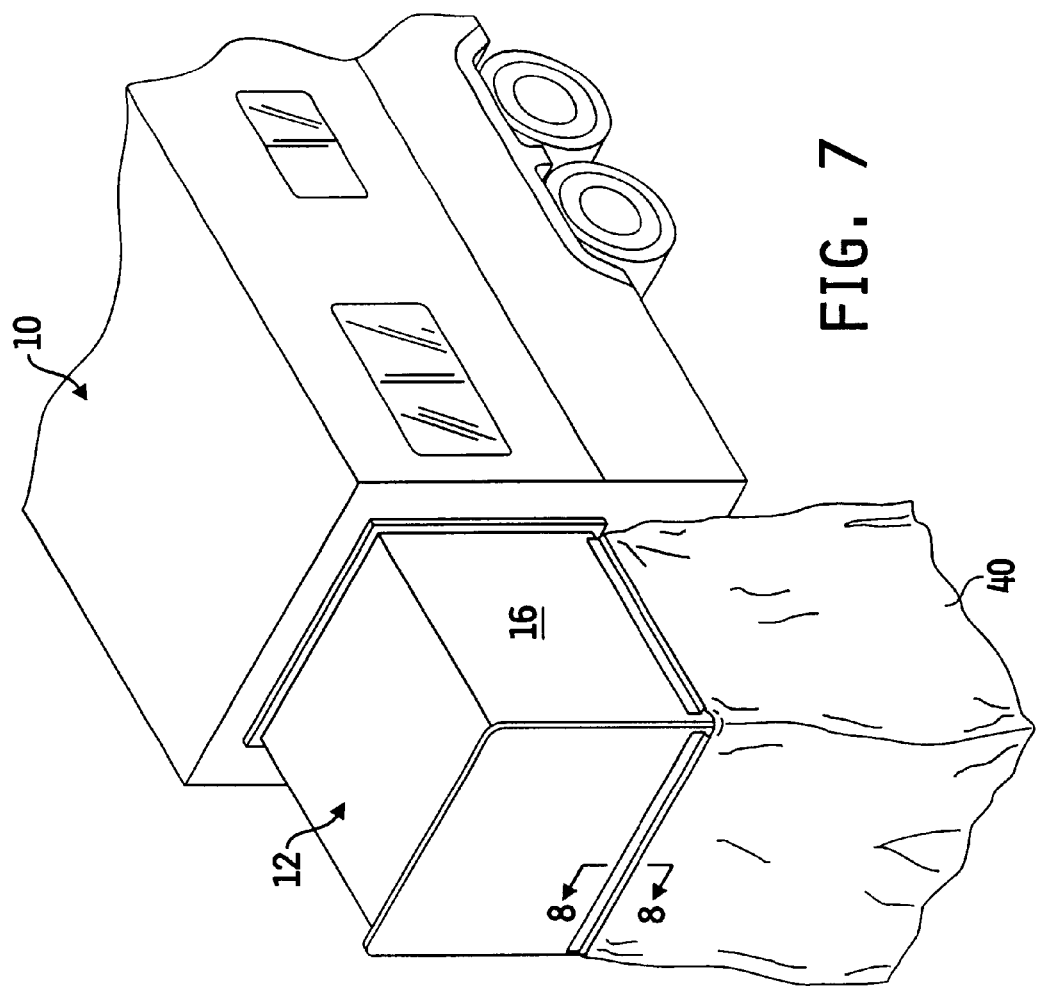
FIG. 7 depicts a curtain extending from the slide-out room for use in storing gear.

In FIG. 7 the slide-out room 12 is shown in its extended position with a curtain 40 extending from the lower edge of the room housing 16 to the ground. As shown in FIG. 8, curtain member 40 may be secured to room housing 16 by being slidably fitted within a channel member 42 which extends along the three exposed sides at the lower edges of the housing. Gear may be stored by the recreational vehicle user within the enclosure formed by curtain 40.

What is claimed is:

1. A vehicle having a rear end wall and a floor and including a slide-out room comprising an opening in said rear end wall, said slide-out room fitted in said opening, upper means and lower means for supporting the slide-out room for movement between a retracted position within said vehicle spaced above said floor and an extended position projecting rearwardly of said rear end wall, wherein the room is elevated above the floor such that furniture is stored beneath said slide-out room and above the floor of the vehicle while in the retracted position and the room is supported above said lower means by a support frame attached thereto.

2. The vehicle as set forth in claim 1 further comprising a ceiling attached and perpendicular to the rear end wall.

3. The vehicle as set forth in claim 2 wherein the upper means includes a guide rail mounted to the ceiling and a hanger attached to the slide-out room for moving within the guide rail.

4. The claim as set forth in claim 3 wherein the guide rail has generally C-shaped cross sectional configuration so as to provide a slot which extends longitudinally along the rail such that the hanger extends through the slot with the rollers being supported within the guide rail.

5. The vehicle as set forth in claim 3 wherein the hanger includes a roller to facilitate movement of the hanger within the guide rail.

6. The vehicle as set forth in claim 1 further comprising a side wall attached to the floor and the rear end wall in perpendicular orientation to both said end wall and floor.

7. The claim as set forth in claim 6 wherein the upper means includes a guide rail mounted to the side wall and a hanger attached at the inner most end of the slide-out room for moving within the guide rail.

8. The claim as set forth in claim 7 wherein the hanger has rollers to facilitate the hangers movement within the guide rail.

9. The claim as set forth in claim 8 wherein the guide rail has generally C-shaped cross sectional configuration so as to provide a slot which extends longitudinally along the rail such that the hanger extends through the slot with the rollers being supported within the guide rail.

10. The vehicle as set forth in claim 1 wherein the lower means includes hollowed rectangular frame members attached beneath the floor of the vehicle and support rails slidably disposed within the frame member.

11. The vehicle as set forth in claim 10 further comprising a spring loaded lock pin attached to the frame member and camming lugs carried for and aft upon the support rail for securing the room in a fully extended and a fully retracted position.

12. The vehicle as set forth in claim 10 further comprising a swing latch mounted to the frame member and a hook mounted at the aft end of the support rail for further securing the slide-out room in the fully retracted position.

13. The vehicle as set forth in claim 1 further comprising a rear bumper assembly mounted to the lower means for supporting the slide-out room.

14. The vehicle as set forth in claim 13 further comprising a removable flexible curtain attached to and extending downwardly from the slide-out room when said room is in the extended position for storing gear and other articles beneath said slide-out room and within the curtain.

15. The vehicle as set forth in claim 13 wherein and the lower means are slidably mounted to frame members attached beneath the floor of the vehicle for supporting the slide-out room for movement between the retracted position within said vehicle spaced above said floor to an extended position projecting rearwardly of said rear end wall.

* * * * *